Nov. 14, 1950   J. T. PARISI   2,530,074
CONVEYING AND DISTRIBUTING APPARATUS
Filed Oct. 28, 1946   2 Sheets-Sheet 1
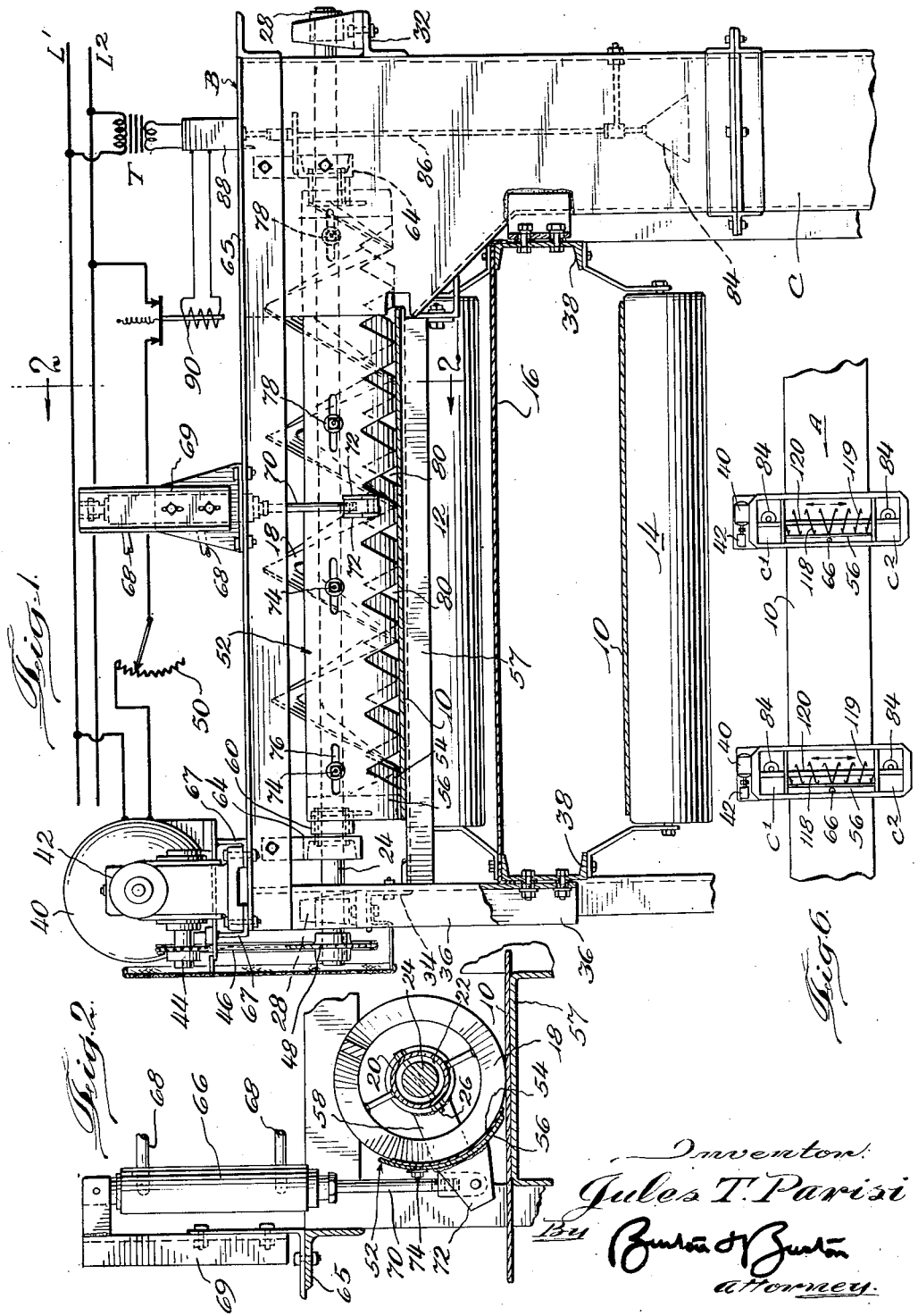
Inventor
Jules T. Parisi
By
Attorney Nov. 14, 1950   J. T. PARISI   2,530,074
CONVEYING AND DISTRIBUTING APPARATUS
Filed Oct. 28, 1946   2 Sheets-Sheet 2
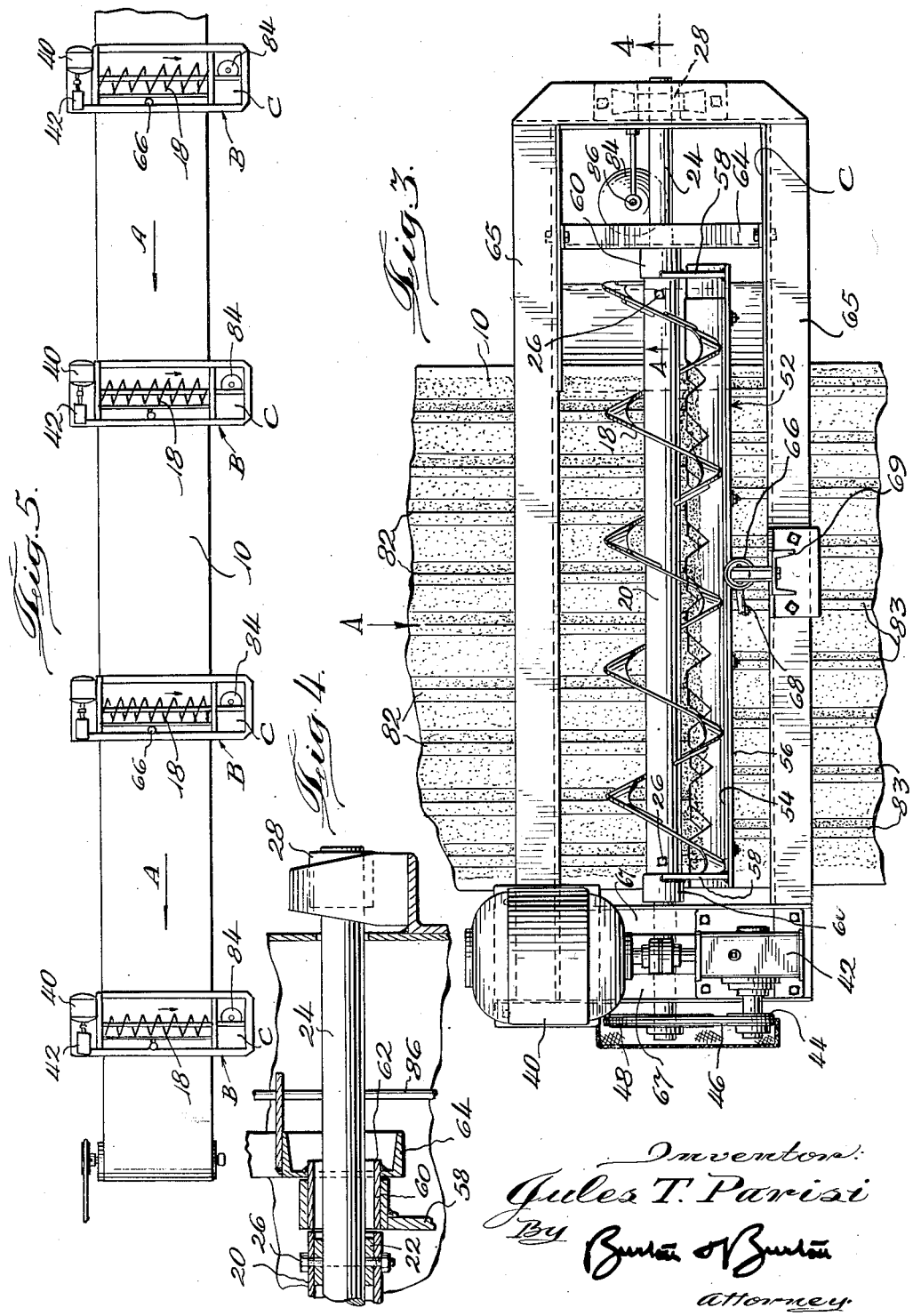
Inventor:
Jules T. Parisi
By Burton & Burton
Attorney Patented Nov. 14, 1950

2,530,074

UNITED STATES PATENT OFFICE 2,530,074

CONVEYING AND DISTRIBUTING APPARATUS

Jules T. Parisi, Chicago, Ill.

Application October 28, 1946, Serial No. 706,167

11 Claims. (Cl. 198—185)

This invention relates to means for conveying and distributing granular material such as molding sand and core sand used in foundries and required for making molds simultaneously at several places. It is common practice to employ a conveyor belt for carrying the sand to various unloading stations at each of which a portion of the sand is shunted off the conveyor belt by means of a plow or baffle board set obliquely to the direction of travel of the conveyor belt. This arrangement, however, involves heavy wear on the belt and also on the edge of the plow which is usually rubber shod, and it tends to compact the sand in a manner which is undesirable. Particularly in the case of core sand which has mixed with it a quantity of binding material such as molasses, it is necessary to aerate or "fluff" the sand to prepare it for the use of the molder, and if this treatment is provided before the sand is delivered to the main conveyor belt, the effect of the operation is partially wasted by the subsequent packing which results from discharging the sand by means of a fixed plow.

One object of this invention is therefore to provide a new and improved means for discharging sand or like granular material from a conveyor belt.

Another object of the invention is to provide new and improved means for discharging granular material from a conveyor belt at a plurality of stations disposed at intervals along the belt with provision for varying the quantity of material discharged at each station.

It is also an object of the invention to provide means for discharging granular material from a conveyor in a manner which shall tend to aerate the material and loosen it rather than to compact it.

Other objects and advantages of the invention will appear from the following description taken in connection with the drawings, in which:

Fig. 1 is a vertical sectional view taken transversely of a main belt conveyor and showing in elevation the unloading or discharge mechanism which is the subject of this invention;

Fig. 2 is a detail sectional view taken as indicated at line 2—2 on Fig. 1;

Fig. 3 is a fragmentary top plan view of the mechanism shown in Fig. 1;

Fig. 4 is a vertical detail section taken as indicated at line 4—4 on Fig. 3;

Fig. 5 is a somewhat diagrammatic plan view showing a plurality of material discharging devices associated with a single belt conveyor;

Fig. 6 is a diagrammatic view similar to Fig. 5, but showing a modified construction.

The main conveyor 10, as shown in the drawings, is of the endless belt type with the upper ply supported on rollers 12 while the return or lower ply is carried on rollers 14 with a shielding apron 16 disposed between the upper and lower portions of the belt. The upper or load-carrying ply may be understood as having a quantity of sand or other granular material delivered to it at a point not shown, and as the belt travels in the direction of the arrows A on Fig. 5 it passes a series of receiving stations B, each of which includes a hopper of which a portion is shown at C in Fig. 1. Associated with each of the hoppers C there is shown a discharge conveyor which includes a conveyor screw 18 of the ribbon type supported on a tubular member 20 which extends transversely of the direction of travel of the belt 10 and preferably at right angles thereto. The tube 20 is carried on bushings 22 which are fitted onto a shaft 24 with pins or bolts 26 extending through the tube 20, bushings 22 and shaft 24. The shaft 24 is journaled in bearings 28 adjacent its ends and at some distance from the edges of the belt 10 to avoid contact with the sand as far as possible, and thus prevent undue wear of the bearings. One of the bearings 28 is carried by a bracket 32 on the vertical wall of the hopper C, and the other bearing 28 is similarly supported by a bracket 34 carried by uprights 36 attached to the horizontal frame members 38 which support the rollers 12 and 14 for the main conveyor belt 10.

The ribbon screw 18 is mounted to run with its helical edge almost in contact with the upper surface of the belt 10 so as to engage and feed laterally a portion of the sand or other material carried by the belt 10. At each station B the screw conveyor 18 is driven by an individual electric motor 40 which is connected to a suitable reducing gearing enclosed in a housing 42 for driving a sprocket gear 44 connected by a chain 46 with a sprocket wheel 48 on one end of the shaft 24. The speed of the motor 40 may be made variable, if desired, as by providing a rheostat indicated at 50 in the motor circuit, as shown in Fig. 1, and such variation in the speed of the driving motor and the screw 18 driven thereby will alter the rate at which material is discharged from the belt 10 by the screw 18.

Supplementing the feed screw 18 there is associated therewith a curved baffle device 52 which conforms substantially to the curved outline of the screw 18 and is located at the opposite side of the screw from that which is first encountered by the material travelling on the belt 10. The baffle 52 extends downwardly toward the belt and adjacent to its upper surface so as to arrest some of the material thereon and hold it in position to be engaged and discharged by the screw 18. But the lower edge of the baffle is formed with openings to permit a considerable portion of the material on the belt to escape and continue its travel on the belt 10 toward the next delivery station B. To provide these openings and render them adjustable the drawings show the baffle 52 as composed of a front plate 54 and a back plate 56, both having triangular notches formed in their lower edges. The back plate 56 is supported by arms 58 at its ends, having collars 60 which bear rotatably upon tubular bearing members 62 supported by frame members 64 as shown in detail in Fig. 4. The members 64 are suspended from frame members 65 which extend across the conveyor belt 10 and above it. At one end these members embrace the outer faces of the hopper C and at the other end they are supported by the uprights 36 and in turn support the motor 40 on cross members 67. Each of the hollow bearings 62 has an inner diameter considerably greater than the outer diameter of the shaft 24, thus permitting the shaft 24 to turn freely within it, and thereby avoiding any serious friction or wear at this point if sand should be lodged on the shaft 24. The mounting of the baffle plate 56 permits it to be swung up or down about the axis of the hollow bearing 62 which is coaxial with the shaft 24; and the front plate 54 is attached to the back plate so as to move up and down with it. This permits adjustment of the baffle with respect to the belt 10 so that it may be raised clear of the load travelling thereon to avoid the discharge of any sand at a particular station, or may be lowered into operative adjustment. To hold the belt accurately in proper relation with the baffle, it travels over an inverted channel 57 disposed directly under the screw 18, as seen in Fig. 2.

For raising and lowering the baffle, Fig. 2 shows a power cylinder 66 carried by a bracket 69 supported on the frame member 65. This cylinder may be supplied either with hydraulic fluid or with compressed air through feed pipes 68 for raising or lowering the piston rod 70 which is attached to a pair of arms 72 extending rigidly from the rear baffle plate 56. Any suitable controlling valve, not shown, may be employed to feed the operating fluid into the cylinder 66 at either end for adjusting the piston rod 70 and the baffle attached thereto.

The front baffle plate 54 is horizontally slidable upon the rear plate 56, having studs 74 which extend through slots 76 in the plate 56 and are fitted with suitable clamping nuts 78 for holding the plate 54 at any adjusted position. It will be seen that by shifting the plate 54 horizontally with respect to the plate 56, the size of the openings 80 formed by the overlapping triangular openings in the lower edges of the two plates will be varied, thus varying the proportion of the material which is allowed to pass the baffle. With a series of stations B disposed at intervals along the belt 10 as shown in Fig. 5, it will be seen that the baffle plates at the first station at which the material arrives on the belt should be adjusted to provide relatively large openings so that most of the material will pass this station for distribution to the remaining stations. The second station in the series will have its baffle adjusted with somewhat smaller openings. As suggested in Fig. 3, the material escaping through the openings in the baffle plate at one station will tend to be arranged in rows, as indicated at 82, these rows approximating the width of the openings through which they have passed. Hence, if the openings of all the baffles are in substantial alignment along the conveyor belt 10, the openings in each succeeding baffle must be somewhat smaller than those in the preceding baffle in order to trap a portion of the material at each station. If preferred, the baffles at alternate stations may be arranged with their openings 80 out of registration so that the rows of material 82 coming from one station will encounter the solid portions of the baffle at the next station; then the transverse movement of material caused by the rotating screw 18 will assist a portion of the material to escape in rows, as indicated at 83, which are out of alignment with the rows 82 and which will therefore encounter the solid portions of the baffle at the next station.

For most purposes it will be more practicable to have the baffles at the several stations exactly alike, with their openings 80 arranged in alignment and to depend upon the graduated adjustment of these openings for securing proper distribution of the material to the several stations. Furthermore, this arrangement will permit taking any single station out of service, if desired, which may be done by employing the power cylinder 66 to raise the baffle to a height clear of the load on the belt 10 and then stopping the feed screw 18; when the screw 18 is at rest, it will offer almost no opposition to the movement of material past it and will not effect the discharge of any appreciable quantity at its station.

Preferably, the hopper C at each station is equipped with an automatic mechanism responsive to the level of the sand or granular material accumulating in the hopper. Such a device is indicated in dotted outline in Fig. 1 as including a downwardly open conical shell 84 attached to a rod 86 which is vertically movable for actuating a switch device enclosed in a housing 88. The accumulation of material upon the cone 84 forces the cone downward to close the low voltage switch in the housing 88, which then actuates a relay 90 to open the motor circuit. The high voltage lead wires for supplying the motor are shown at L—1 and L—2 with a transformer T connected thereto for supplying low voltage current to the relay 90. With this arrangement the motor 40 and the feed screw 18 will be stopped automatically whenever the bin C at any station is filled to a predetermined level, and, if desired, the electrical control may include means (not shown) for actuating the power cylinder 66 so as to raise the baffle clear of the load on the belt 10 whenever the screw 18 is stopped.

With the controls described, it becomes possible to regulate very accurately the rate at which material is delivered to each of the stations B and to adjust the discharge conveyor screw feeding mechanism and the baffles so as to provide the operator at each station with the material at the rate required for his particular work. In the case of molding operations, this may vary considerably as between the different stations, or, as already noted, one or two stations may be idle for certain periods. Furthermore, the agitation of the material is advantageous, particularly in the case of core sand, and it has been found that in handling this material with the apparatus described, it is unnecessary to provide any additional or supplemental aerator or "fluffing" device because the transverse feeding of the material for discharge to each hopper tends to break up and loosen any accumulated or compacted masses thereof so that it arrives in the hopper in ideal condition for use. The fact that the screw conveyor is of the ribbon type adds materially to its efficiency in aerating or fluffing the sand or other granular material handled by the conveyor; the helical rim of the screw is spaced at a substantial distance radially from the tubular member 20 so that the ribbon cuts through the sand instead of merely pushing it aside. When the feed screw stands still, the helical portion standing adjacent the conveyor belt 10 does not materially prevent the sand on the belt from being carried past the screw, but if the sand load is of substantial depth, it will flow over the turns of the ribbon screw and will be aerated by this action.

For some installations it may be desirable to provide work stations at both sides of the belt. Fig. 6 suggests such an arrangement with hoppers C¹ and C² located adjacent opposite margins of the belt 10. Each feed screw includes the axial tubular member 120, but instead of a single screw, this member carries two ribbon screws 118 and 119 extending respectively from the middle of the belt 10 outwardly and of opposite pitch so that they will simultaneously feed the material to both hoppers C¹ and C². Each pair of feed screws 118 and 119 will be provided with a baffle plate 56 and an adjusting cylinder 66 therefor; and it may be desirable to fit each of the hoppers C¹ and C² with a level-responsive control member, as indicated at 84, for stopping and starting the driving motor 40.

While there are shown and described herein certain structures embodying the invention, many modifications may be made without departing from the spirit of the invention, and I do not wish to be limited to the precise details of construction set forth, but desire to avail myself of all changes within the scope of the appended claims.

I claim as my invention:

1. In combination, a horizontally travelling conveyor and a second conveyor mounted above it and adapted to move material carried by said first mentioned conveyor transversely of the direction of travel of that conveyor for discharging said material therefrom, together with a hopper positioned to receive the material thus discharged, a motor connected to drive said second conveyor, switch means controlling said motor, and means in said hopper responsive to the level of material therein and connected to actuate said switch means for stopping the motor when the material reaches a predetermined level in the hopper.

2. In combination, a main horizontally travelling conveyor for granular material, a plurality of receiving receptacles disposed at intervals adjacent said conveyor, a discharge conveyor disposed above said main conveyor at each receptacle adapted to move material carried by the main conveyor transversely of the direction of travel of said main conveyor, and a baffle device to the rear of each discharge conveyor and extending across the main conveyor for arresting a portion of the material carried by said main conveyor in position to be shifted laterally by the discharge conveyor.

3. In the combination defined in claim 2, an individual motor for driving each discharge conveyor and a switch means in each of said receptacles operable automatically when the material in the receptacle rises to or drops below a predetermined level for controlling operation of the motor which drives the discharge conveyor associated with that receptacle, said switch means operating independently of each other.

4. In combination, a horizontally travelling conveyor, a feed screw mounted over said conveyor with its axis transverse to the direction of conveyor travel, said screw comprising portions of opposite pitch extending respectively toward opposite edges of the conveyor, means to rotate the screw for discharging material simultaneously from both sides of the conveyor, and a baffle plate on one side of said feed screw and also extending transversely of the direction of travel of the conveyor in close proximity to the top run of said horizontally traveling conveyor for intercepting at least a portion of the material thereon in position to be discharged simultaneously on opposite sides of the conveyor by the feed screw.

5. In a system for handling granular material, in combination, a horizontally traveling conveyor for transporting said material and a second conveyor extending transversely of said first mentioned conveyor closely adjacent its upper run, said second conveyor having a helical blade for agitating and aerating the granular material on the first mentioned conveyor and moving at least a portion thereof transversely of the direction of travel of said first conveyor for discharging said portion, and means to vary the speed of said blade relative to the speed of travel of the first mentioned conveyor.

6. In combination, a horizontally traveling conveyor, a feed screw mounted over said conveyor with its axis transverse to the direction of conveyor travel, and means to rotate said screw for discharging material from the conveyor together with a baffle concentric with at least a portion of said screw and having an edge adapted to be disposed in close proximity to the top run of said conveyor, said edge extending transversely of the direction of travel of the conveyor on one side of said screw to arrest a portion of the material in position to be shifted transversely by the screw.

7. In combination, a horizontally traveling conveyor, a feed screw mounted over said conveyor with its axis transverse to the direction of conveyor travel, and means to rotate said screw for discharging material from the conveyor together with a baffle concentric with a portion of said screw and having an edge extending transversely of the direction of travel of the conveyor on one side of said feed screw in close proximity to the top run of said conveyor to arrest a portion of the material in position to be shifted transversely by the screw, and means for controlling the amount of material arrested by said baffle including means supporting the same coaxially with respect to said screw for rocking movement between an operative and an inoperative position.

8. In combination, a horizontally traveling conveyor for granular material, a feed screw mounted over said conveyor with its axis transverse to the direction of conveyor travel, and means to rotate said screw for discharging material from the conveyor together with a baffle including relatively movable plates each having a notched edge adapted to be disposed on one side of said feed screw in close proximity to the top run of said conveyor for arresting a portion of the material carried by said conveyor in position to be shited transversely by said screw for discharging the same from the conveyor, said plates being relatively movable to vary the areas of the openings in said edges which lie in registration and thus control the amount of material intercepted, and means supporting said plates for movement between operative and inoperative position.

9. In a system for conveying granular material, in combination, a horizontally traveling conveyor, and a second conveyor mounted above it and adapted to move material on the first mentioned conveyor transversely of the direction of travel of that conveyor for discharging said material therefrom together with a baffle having a notched edge adapted to be extended across the first conveyor on one side of said second conveyor to intercept a portion of the material thereon at a position to be discharged by said second conveyor and to converge the portions of material passing through said opening into parallel rows on said first mentioned conveyor, and means for controlling the amount of material intercepted by said baffle including means for varying the area of the notches in said edge through which material will pass.

10. In combination, a horizontally traveling conveyor and a second conveyor mounted above it and adapted to move material on the first mentioned conveyor transversely of the direction of travel of that conveyor for discharging said material therefrom together with a baffle adapted to be disposed with respect to said first mentioned conveyor to intercept at least a portion of the material thereon at a position to be shifted by the second conveyor transversely of the first mentioned conveyor for discharge therefrom, and means for controlling the amount of material intercepted by said baffle including means supporting the same or movement between an operative and an inoperative position.

11. In a system for conveying granular or like material in combination, a horizontally traveling conveyor and a second conveyor mounted above it and adapted to move material on said first mentioned conveyor transversely of the direction of travel of that conveyor for discharging said material therefrom together with a baffle having an edge with openings therein adapted to be disposed in close proximity to the top run of said first conveyor for intercepting at least a portion of the material carried by the said first conveyor at a position to be discharged transversely therefrom by said second conveyor, means supporting said baffle for movement between an operative and an inoperative position, and means for varying the effective area of the openings in said edge for varying the amount of granular material intercepted by said baffle.

JULES T. PARISI.

REFERENCES CITED

The following references are of record in the file of this patent:

UNITED STATES PATENTS

| Number | Name | Date |
|---|---|---|
| Re. 3,183 | Williams | Nov. 10, 1868 |
| 731,073 | Rust | June 16, 1903 |
| 1,015,004 | Choundard | Jan. 16, 1912 |
| 1,045,939 | Brotz | Dec. 3, 1912 |
| 1,291,668 | Burton | Jan. 14, 1919 |
| 1,716,968 | May | June 11, 1929 |
| 1,756,561 | Larsen | Apr. 29, 1930 |
| 1,778,393 | Klugh | Oct. 14, 1930 |
| 2,000,292 | Miller | May 7, 1935 |
| 2,311,865 | Pilcher | Feb. 23, 1943 |
| 2,362,079 | McCann et al. | Nov. 7, 1944 |